United States Patent

[11] 3,555,308

[72] Inventor Arnold J. Peterson
    Richmond, Ind.
[21] Appl. No. 779,441
[22] Filed Nov. 27, 1968
[45] Patented Jan. 12, 1971
[73] Assignee Avco Corporation
    Richmond, Ind.
    a corporation of Delaware

[54] ELECTRONIC CIRCUIT FOR ELECTROCHEMICAL TIMER
6 Claims, 3 Drawing Figs.

[52] U.S. Cl.................................................. 307/293,
    307/252; 317/231; 328/129; 331/113
[51] Int. Cl................................................... H03k 17/28
[50] Field of Search......................................... 307/293,
    305, 252; 328/129; 317/230, 231; 331/113

[56] References Cited
UNITED STATES PATENTS
3,444,439  5/1969  Hoeksema.................... 317/231

Primary Examiner—Donald D. Forrer
Assistant Examiner—John Zazworsky
Attorneys—Charles M. Hogan and Irwin P. Garfinkle ABSTRACT: A longterm timing system includes an electrochemical cell, the impedance of which is very low until its anode deplates of silver. Deplating results from the application of current pulses supplied from a free-running multivibrator having time constants providing a low duty cycle. A detector circuit functioning at the time the electrochemical cell is substantially deplated serves to increase the pulse repetition rate of the multivibrator to accelerate deplating. This arrangement results in a more abrupt increase in cell impedance and therefore improves the accuracy of the overall time interval.

3,555,308

INVENTOR.
ARNOLD J. PETERSON
BY Charles M. Hogan
Irwin P. Garfinkle
ATTORNEYS.

ELECTRONIC CIRCUIT FOR ELECTROCHEMICAL TIMER

BACKGROUND OF THE INVENTION

The present invention is an improvement over the invention of Tuten and Gauld disclosed in the U. S. Pat. application entitled "Long Delay Timing system," Ser. No. 739,011 filed June 21, 1968, and assigned to the same assignee as this invention.

This invention as well as the Tuten and Gauld invention utilizes an electrochemical cell to provide a timing system. In the simplest form such systems utilize an electrochemical cell having its anode initially plated with a precise quantity of silver. The length of time required to deplate the anode by current flow from the anode to the cathode is a function of the amount of silver initially deposited on the anode and the average current level. In its initial condition the impedance of the cell is very low and it remains essentially constant until such time as the anode is substantially deplated of silver. At such time the impedance level of the cell increases. The detection of the increase in impedance of the cell may be used for signalling the end of the deplating time period.

As pointed out by Tuten and Gauld, reliable cell operation requires a current flow which is greater than a known minimum level. Below this known minimum level, the cell may experience catastrophic failure due to dendrite formation between the anode and the cathode. Such formations short circuit the cell, preventing the generation of an impedance increase. This means that current levels from the battery supply must be maintained high, and for longterm timing periods in the order of months, this necessitates the use of large batteries as well as large electrochemical cells.

Tuten and Gauld overcame the disadvantages of the prior system by supplying high current, short duration pulses to the cell. The application of high current overcame the dendrite problem. By widely spacing the pulses, the average current was maintained at a power level calculated to complete deplating at the end of the desired time.

It has been found that the impedance of the cell increases, just prior to complete deplating, at a rate that is dependent on the level of current flow. I have found it desirable to increase the rate of deplating to as high a rate as possible at the end of the timing interval. Such an acceleration of the deplating rate causes a more abrupt impedance change and hence a more accurate determination of the timing period. The present invention accomplishes this by providing circuitry which detects impedance change of the cell, and in response thereto increases the repetition rate of the pulses applied to the cell to accelerate the deplating of the anode.

THE DRAWINGS

DESCRIPTION OF THE INVENTION

Figure 1:
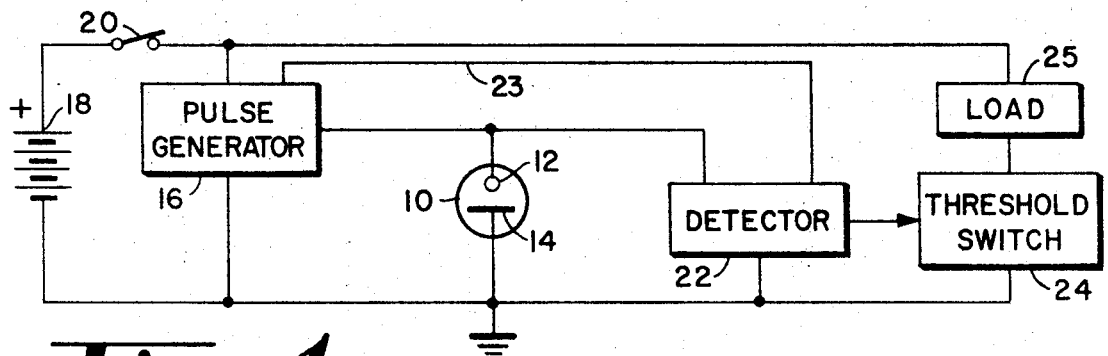
Fig. 1 is a block diagram of a representative embodiment of this invention.

Referring to the block diagram of FIG. 1, the timing system comprises an electrochemical cell 10 having an anode 12 and a cathode 14. Generally the anode of such cells has a noble metal surface while the cathode plated with silver is spaced from the anode in a liquid or solid electrolyte. For the purposes of this timing application, the silver is initially plated not on the cathode but on the anode. This is accomplished by applying current through the cell in the direction from the cathode 14 to the anode 12, i.e., the positive side of a battery connected to the cathode 14 and the negative side connected to the anode 12. When a precise precalculated amount of silver is so plated on the anode, the cell is said to be in a "set" condition. Deplating of the anode is then accomplished by applying current to the cell in the opposite direction.

In the illustrated timing system, current is supplied to the cell from a pulse generator 16. The pulse generator is designed to continuously deliver current pulses having a magnitude substantially greater than the minimum level required to avoid the formation of dendrites and having a pulse repetition rate (or duty cycle) calculated to provide an average current sufficient to deplate the anode at a given rate so that it will be fully deplated at the end of a predetermined time period. The pulse generator 16 is powered by means of a battery 18 through a switch 20.

Figure 3:
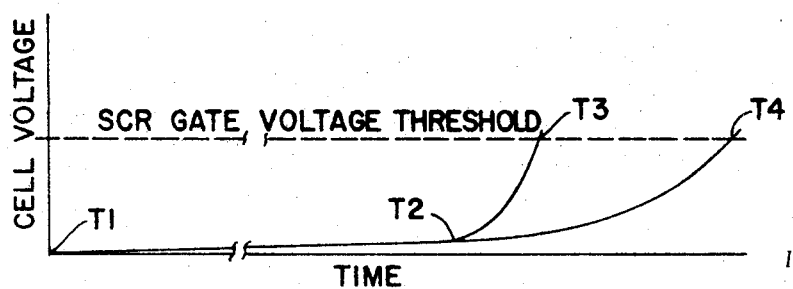
FIG. 3 shows curves illustrating the characteristics of the timing circuit with and without the use of this invention.

As seen in FIG. 3 where the cell voltage versus time is plotted, the impedance of the cell is initially very low but slowly rises as deplating of the anode occurs. Thus, from time T1, the beginning of the timing cycle, until time T2, the point at which deplating is substantially complete, there is essentially no change in impedance. After time T2 the impedance of the cell begins to increase at an accelerated rate until it reaches a particular threshold level. Without the use of this invention the necessary threshold level would be reached at time T4. By means of this invention the threshold level is reached at time T3. This result is accomplished by accelerating the pulse repetition rate of the pulse generator 16 when the cell reaches the impedance level at time T2.

To detect the increased impedance level at time T2, the cell 10 is connected across the input of a detector 22. The detector 22 is so biased that when the impedance of the cell 10 increases to a predetermined level, the detector circuit begins to conduct. Such condition through line 23 results in an increased repetition rate from the pulse generator 16. This results in faster deplating of the anode 12, which in turn results in larger detector current flow. Therefore, deplating of the anode 12 occurs at an accelerating rate until such time as the current through the detector is of a sufficient magnitude to trigger a threshold switch 24, which in turn serves to complete the energization circuit through a load 25.

Figure 2:
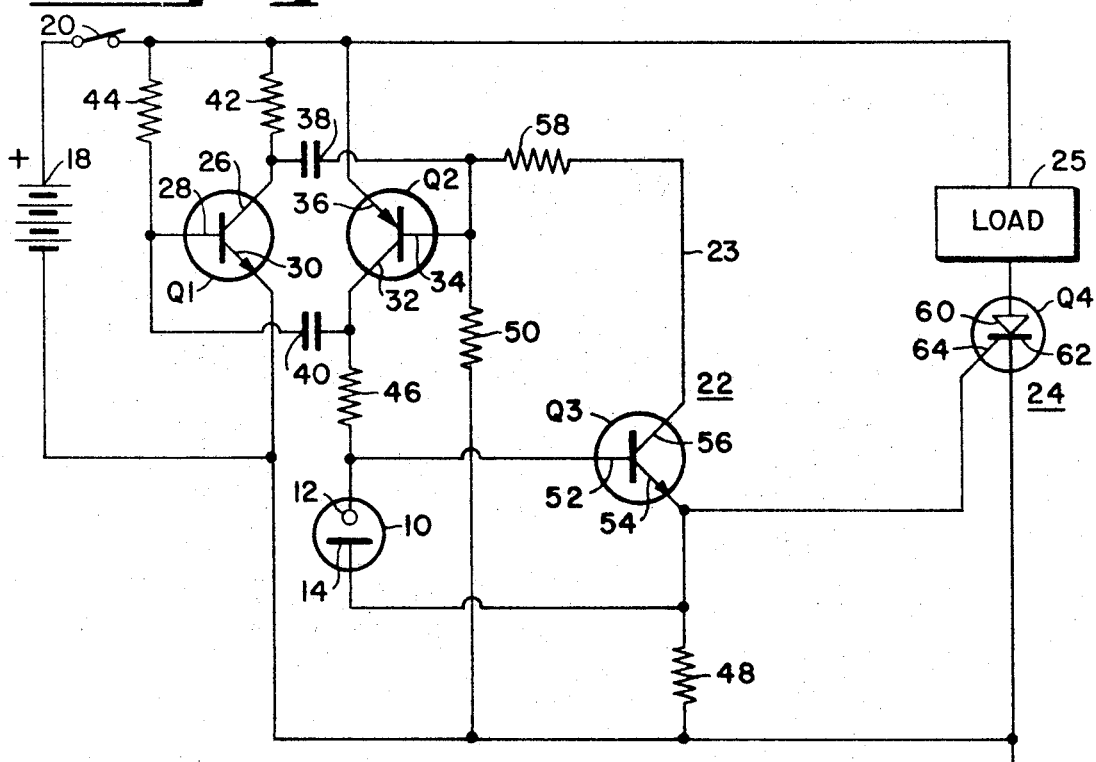
FIG. 2 is a schematic diagram showing the details of the embodiment of FIG. 1.

The circuitry for performing the functions of Figure 1 is shown in FIG. 2, where the pulse generator for supplying current to the electrochemical cell 10 is illustrated as a free-running multivibrator comprising an NPN type transistor Q1 having a collector 26, a base 28, and an emitter 30, and a PNP type transistor Q2 having a collector 32, a base 34, and an emitter 36. As in conventional multivibrator circuitry, the collector 26 of transistor Q1 is connected to the base 34 of transistor Q2 through a capacitor 38 while the collector 32 of transistor Q2 is connected to the base 28 of transistor Q1 through a capacitor 40. The collector 26 of the NPN type transistor Q1 is connected to the positive side of battery 18 through a resistor 42 while its base 28 is similarly connected through a resistor 44. The emitter 30 of transistor Q1 is connected to ground. Similarly, the collector 32 of the PNP type transistor Q2 is connected to ground through a resistor 46, the electrochemical cell 10 (initially a very low impedance), and a small resistor 48, while its base 34 is connected to ground through a resistor 50. The emitter 36 is connected directly to the positive side of the battery 18.

The detector circuit 22 comprises an NPN type transistor Q3 having its base 52 connected to the anode 12 of the cell 10 and an emitter 54 connected to the cathode 14. The collector 56 of transistor Q3 is connected to the junction of resistor 50 and capacitor 38 through line 23 and a small resistor 58. The threshold circuit 24 comprises a silicon controlled rectifier Q4 having its anode 60 and its cathode 62 connected in series with the load across the battery 18. A control electrode 64 of the rectifier Q4 is connected to the emitter 54 of transistor Q3.

OPERATION OF THE CIRCUIT

The multivibrator, consisting of the transistors Q1 and Q2, is conventional, each transistor delivering a pulse having a relatively narrow width with relatively wide spacings between the pulses, the width and spacings being determined by the R.C. constants within the circuit. Because of the complementary symmetry between the transistors Q1 and Q2, the transistors Q1 and Q2 pulses at the same time and are cut off during the same periods. Under initial operating conditions, i.e., when the impedance of the electrochemical cell 10 is low, the interval between pulses is determined by the R.C. value of the capacitor 38, the resistor 50, and the resistor 42, and these values are selected so as to develop a current having the average level required to deplate the anode of the cell 10 after a predetermined time. In the particular arrangement shown it is the output from the transistor Q2 which serves to deplate the anode 12. These output pulses are applied from the battery 18 through the emitter and collector of transistor Q2, the resistor 46, the cell 10, and the small resistor 48 to ground.

Since the base and emitter electrodes of the transistor Q3 are connected across the cell 10, and since the cell 10 is essentially a short circuit, the transistor Q3 is nonconducting. However, after time T2 the impedance of the cell 10 increases to a level sufficient to start forward biasing transistor Q3 into conduction. The impedance of the discharge path for the capacitor 38 then includes the path through the small resistor 58 and the collector and emitter of transistor Q3. Since this is a substantially reduced impedance path, compared to resistor 50, the repetition rate of the multivibrator is increased. Furthermore, the higher the impedance value of the cell 10, the more the conduction through transistor Q3. This results in a rapidly accelerating pulse repetition rate and in a rapidly accelerating increasing impedance for the cell 10. This process continues until oscillation stops with transistor Q2 on, and with the average current equal to the peak pulse current. This results in the rapid transition of the electrochemical cell to a high impedance, thereby rapidly saturating transistor Q3, at which point the voltage on resistor 48 exceeds the threshold level of the silicon controlled rectifier Q4, causing it to trigger, thereby connecting the battery 18 to the load 25.

While the current path through the transistor Q3 tends to divert current from the cell 10, the increased output of the multivibrator more than compensates for this diversion of current. Thus, the use of the detector transistor Q3 causes a rapid transition of the electrochemical cell 10 voltage from a low impedance to a high impedance in a much shorter period as compared to the prior circuits. This reduces any inaccuracies in timing resulting from differences in cell characteristics. It will also be noted that the input circuit of the silicon controlled rectifier Q4 is connected across the small resistor 48 in the conduction path of transistor Q3. This insures an increased maximum current to become available at the end of the timing interval which will trigger the silicon controlled rectifier Q4 with higher reliability.

PARAMETERS OF A TYPICAL TIMING CIRCUIT

Although the invention is not limited to the use of any particular parameters, an example of this circuit as reduced to practice consisted of the following parameters:

| | | |
|---|---|---|
| Electrochemical Cell 10 | | [1] 500 |
| Battery 18 | volts | 3 |
| Transistors: | | |
| Q1 | Type | 2N3641 |
| Q2 | Type | 2N3640 |
| Q3 | Type | 2N3641 |
| Q4 | Type | 2N5060 |
| Resistors: | | |
| 42 | ohms | 110K |
| 44 | megohms | 22 |
| 46 | ohms | 110K |
| 48 | do | 1K |
| 50 | megohms | 22 |
| 58 | ohms | 1K |
| Capacitors: | | |
| 38 | pf | 470 |
| 40 | pf | 470 |

[1] Micro ampere-hours.

Various modifications and adaptations will be apparent to persons skilled in the art. For example, other pulse generators may be substituted for the particular multivibrator shown, the only requirement being that the pulse repetition rate of the pulse generator can be varied in response to a detected increase in the impedance level of the cell 10. Furthermore, other types of electronic switches may be substituted for the silicon controlled rectifier. It is intended therefore that this invention be limited only by the appended claims as interpreted in the light of the prior art.

I claim:

1. A timing system comprising:
   a source of direct current;
   an electrochemical cell having an anode and a cathode, said anode having a given amount of material plated thereon, said material being transferable from said anode to said cathode in response to current flow through said cell from said anode to said cathode, the time of transferring all of said material being a function of the average current flow and the quantity of said material, said electrochemical cell requiring a current level therethrough above a given minimum level to prevent formation of dendrite between said anode and cathode, said cell having a substantially constant low impedance until substantially all of said material is transferred, whereafter the impedance of said cell increases at an accelerated rate;
   means for converting the output of said direct current source into a series of current pulses, said pulses having peak values substantially greater than said minimum level and having a predetermined pulse repetition rate;
   means for applying said pulses through said cell in the direction from said anode to said cathode;
   a variable impedance device connected between the anode and cathode of said cell, the impedance of said variable impedance device varying as a function of the impedance of said cell above a predetermined level;
   and means responsive to the variation in the impedance of said variable impedance device for increasing said pulse repetition rate, whereby the transfer of said material is accelerated.

2. The invention as defined in claim 1 wherein said means for converting the output of said source comprises a free-running multivibrator having an R-C network therein, said multivibrator being operatively biased by said source of direct current, the pulse repetition rate of said multivibrator being established by the values of the resistive and capacitive impedances in said network, said variable impedance device being included in said network.

3. The invention as defined in claim 2 wherein said multivibrator comprises first and second transistors each having a base, an emitter, and a collector, the collector of the first transistor being connected to the base of the second transistor through a first capacitor, the collector of the second transistor being connected to the base of the first transistor through a second capacitor, said first capacitor being connected to ground through an impedance path including said variable impedance device.

4. The invention as defined in claim 3 wherein one of said transistors is a PNP type transistor and the other is an NPN type transistor, and wherein said source of direct current is a two terminal source, one of said terminals being connected to ground, the emitter of said NPN transistor and the collector of said PNP transistor being connected to ground, and the collector of said NPN transistor and the emitter of said PNP transistor being connected to the other terminal of said source.

5. The invention as defined in claim 4 wherein said variable impedance device comprises a third transistor having a base, an emitter, and a collector, said base and emitter being connected between the anode and cathode of said cell, said collector and emitter being connected in said path, conduction of said third transistor serving to decrease the resistive value of said path thereby increasing the pulse repetition rate of said multivibrator.

6. The invention as defined in claim 5, and a resistor included in said path between the emitter of said third transistor and ground;
   a silicon controlled rectifier having an anode, a cathode, and a control electrode, said cathode and control electrode being connected across said resistor;
   a load; and
   a connection from the other terminal of said source through said load, the anode and cathode of said silicon controlled rectifier to ground.